(12) United States Patent
Nestle

(10) Patent No.: US 10,724,576 B2
(45) Date of Patent: Jul. 28, 2020

(54) ROLLING-ELEMENT BEARING CAGE

(71) Applicant: Albrecht Nestle, Bamberg (DE)

(72) Inventor: Albrecht Nestle, Bamberg (DE)

(73) Assignee: AKTIEBOLAGET SKF, Gothenburg (SE)

( * ) Notice: Subject to any disclaimer, the term of this patent is extended or adjusted under 35 U.S.C. 154(b) by 684 days.

(21) Appl. No.: 15/005,142

(22) Filed: Jan. 25, 2016

(65) Prior Publication Data

US 2016/0215823 A1    Jul. 28, 2016

(30) Foreign Application Priority Data

Jan. 23, 2015   (DE) ........................ 10 2015 201 170

(51) Int. Cl.
   *F16C 33/46*   (2006.01)
   *F16C 33/51*   (2006.01)
   *F16C 19/30*   (2006.01)

(52) U.S. Cl.
   CPC ...... *F16C 33/4676* (2013.01); *F16C 33/4617* (2013.01); *F16C 33/513* (2013.01); *F16C 19/305* (2013.01); *F16C 2300/14* (2013.01)

(58) Field of Classification Search
   CPC .. F16C 19/305; F16C 33/467; F16C 33/4676; F16C 33/4694; F16C 33/4617
   See application file for complete search history.

(56) References Cited

U.S. PATENT DOCUMENTS

| 1,494,392 | A | * | 5/1924 | Van Loozen | ......... | B60B 27/001 |
| | | | | | | 384/623 |
| 3,652,141 | A | * | 3/1972 | Husten | .................... | F16C 19/30 |
| | | | | | | 384/455 |
| 4,077,683 | A | | 3/1978 | Bhateja et al. | | |
| 8,814,440 | B2 | * | 8/2014 | Fukami | .................... | F16C 19/30 |
| | | | | | | 384/623 |
| 8,905,646 | B2 | * | 12/2014 | Omoto | ................ | F03D 11/0008 |
| | | | | | | 384/548 |
| 2009/0046974 | A1 | | 2/2009 | Omoto et al. | | |

FOREIGN PATENT DOCUMENTS

| DE | 1957123 U | 3/1967 |
| DE | 3320763 A1 | 12/1983 |
| DE | 102011089078 A1 | 6/2013 |
| JP | H06280863 A | 10/1994 |
| JP | 2000074073 A | 3/2000 |
| JP | 2003013967 A | 1/2003 |
| JP | 2013068314 A | 4/2013 |
| JP | 2013190006 A | 9/2013 |
| JP | 2014095481 A | 5/2014 |
| JP | 2014219090 A | 11/2014 |

OTHER PUBLICATIONS

Translation of JPH06280863 obtained Jan. 29, 2018.*

* cited by examiner

*Primary Examiner* — James Pilkington
(74) *Attorney, Agent, or Firm* — J-Tek Law PLLC; Scott T. Wakeman; Mark A. Ussai

(57) ABSTRACT

A rolling-element bearing cage includes a plurality of cage segments, each cage segment including at least two adjacent receiving pockets, each receiving pocket being delimited by a front cage bridge having a front running surface for contacting a rolling element and a rear cage bridge having a rear running surface for contacting the rolling element. The front running surface and the rear running surface of at least one of the at least two adjacent receiving pockets are asymmetric relative to a center plane that divides the receiving pocket.

20 Claims, 3 Drawing Sheets

ROLLING-ELEMENT BEARING CAGE

CROSS-REFERENCE

This application claims priority to German patent application no. 10 2015 201 170.4 filed on Jan. 23, 2015, the contents of which are fully incorporated herein by reference.

TECHNOLOGICAL FIELD

The disclosure is directed to a rolling-element bearing cage made of a plurality of cage segments assembled into an annular structure. Each cage segment includes at least two adjacent receiving pockets, and each receiving pocket is delimited by two adjacent bridges.

BACKGROUND

Segmented cages of the above-mentioned type are commonly used in certain types of rolling-element bearings, especially in large bearings. Two or more rolling elements are housed in each rolling-element bearing cage segment. The cage segments are configured to guide the rolling elements while maintaining a defined circumferential spacing of the rolling elements relative to one another and to accelerate the rolling elements if they are located in a load-free zone of the rolling-element bearing. For example, designs are known in which four rolling elements (rollers or also balls) are received in a cage segment and guided by the cage segment. These cage segments can be made of plastic, but even when plastic is used, the combined weight of the cage segment and the rolling elements it contains can exceed 10 kg.

Circumferential clearance must be present between the cage segments in order to maintain proper functioning of the bearing and also due to manufacturing tolerances. This clearance may range from a few millimeters up to a few centimeters. Under certain load conditions a cage segment filled with rolling elements in a load-free zone of the bearing may collide with an adjacent cage segment. The collision creates high impact forces and corresponding stresses. Accordingly such collisions create high loads on the cage and its segments, and this can lead to breakages and early bearing failures.

The impact load on the entire cage depends on how strongly each rolling element retained by the cage impacts against a cage bridge directly in front of it in a direction of movement. If one cage segment collides with a cage segment in front of it, the following can happen.

First the trailing cage segment can impact against the outer surface of the last cage bridge of the cage segment directly in front of it. This causes the trailing cage segment to decelerate.

When the trailing cage segment stops, the rolling elements in that cage segment continue to move due to inertia and impact against the cage bridges immediately in front of them in the direction of movement. The rolling elements in a given cage segment may be located different distances from the bridge that is ahead of the rolling element in the movement direction. Accordingly all of the rolling elements can impact an upstream cage bridge at the same time or at different times. If four rolling elements are present per cage segment, for example, the impact forces experienced by the cage segment may be up to four times greater than the impact force produced by a single one of the rolling elements impacting against a cage bridge. Accordingly the structure of the cage segment must be designed for the greatest anticipated load, i.e., for the load experienced when all rolling elements impact on an upstream cage bridge at the same time.

Furthermore it has been found that the force or shock produced by rolling elements impacting a given cage bridge is also transmitted to the entire cage, i.e., from cage segment to cage segment and to cage segments other than the one holding the impacting rolling element. Disadvantageously, this may produce unwanted vibrations and a rough or noisy operation of the rolling-element bearing. Furthermore, the material of the cage or of its segments is subjected to a correspondingly high load.

The known remedies for reducing impact load are not entirely satisfactory. First circumferential clearance may be reduced. However, the ability to reduce clearance is limited by production methods and the costs associated with maintaining a small clearance. The mass of each cage segment can also be reduced. However, this reduces the overall load capacity of the rolling-element bearing. It is also sometimes possible to reduce or avoid the load-free zone, but this is not always possible.

SUMMARY

A first aspect of the disclosure is to provide a rolling-element bearing cage of the above-described type such that improvements can be achieved in this respect. Accordingly the dynamic behavior of the rolling-element bearing should be improved with such a cage. This is achieved by the above-described impact load being reduced within and between the cage segments. The disclosure provides an easy-to-implement solution that can be realized in a cost-effective manner and does not have the disadvantages of the above-mentioned previously attempted remedies.

These benefits are obtained by configuring the pockets of the cage segments to be asymmetric about a center plane dividing the receiving pocket such that at least one of the running surfaces of the cage bridges defining a particular pocket is not radial.

Preferably all of the receiving pockets are configured in this manner.

Each cage segment preferably includes three, four, or five adjacent receiving pockets.

The running surfaces can be configured straight perpendicular to the axis of rotation of the rolling-element bearing cage. Thus in a preferred embodiment an extension of one of the two running surfaces of a given pocket extends through the axis of rotation of the rolling-element bearing cage, and an extension of the other of the two running surfaces of the given pocket does not extend through the axis of rotation of the rolling-element bearing cage.

Mostly due to their curvature the running surfaces define a contact point or a contact line for the rolling elements located in the receiving pockets. According to a disclosed embodiment, these contact points or contact lines—viewed from the axis of rotation of the rolling-element bearing cage—lie at different heights or radial distances. This is true at least for the running surfaces that define the sides of a given pocket.

The rolling-element bearing cage can be configured for receiving cylindrical rollers, tapered rollers, or also balls. It is preferably comprised of plastic.

The present disclosure finds particular application in large bearings that have an outer-ring outer diameter of at least 500 mm.

While in conventional cage segments, mutually opposing running surfaces of the receiving pocket are always symmetric, in the present disclosure the mutually opposing running surfaces of a receiving pocket are asymmetric.

Embodiments of the disclosure thus reduce the impact load of cage segments filled with rolling elements; as explained above, in a cage segment filled with a plurality of rolling elements the impact load is the sum of the individual impact forces of the respective rolling elements when they collide with the cage bridge of their receiving pockets.

This is achieved in a simple and efficient manner by the targeted asymmetric design of the cage-bridge running surfaces of the receiving pockets. Impacts or running of the rolling elements on the cage bridges thus occur at a defined (temporal) offset. The situation that all of the rolling elements impact against their cage bridges at the same time and thus lead to a high load peak can thus be avoided.

Accordingly the cage bridges, that is, the pockets of the cage segments, are configured asymmetric, i.e., the running surface for the rolling elements is designed differently on the front or frontward cage bridge in the movement direction than on the rear or rearward cage bridge with respect to the movement direction. Contact only occurs here if the cage delays the rolling elements, which only occurs in the case of a cage segment impacting against an adjacent segment. Otherwise the cage guides or accelerates the rolling elements such that contact is only present in the rearward cage segment with respect to the direction of movement. Consequently it is advantageous if the running surfaces or cage segments lying frontward in the direction of movement are asymmetric, but the running surfaces or cage segments lying reward with respect to the direction of movement are symmetric (for this purpose see the following description of FIG. 2).

It can also be provided that the contact between the rolling elements and the cage bridges is asymmetric in this respect, due to the fact that the contact point or the contact line between the cage bridges that are frontward or rearward with respect to the direction of movement is changed (for this purpose see the following description of FIG. 4). In previously known solutions the contact points or contact lines were always located on the same diameter. Due to the change of the shape of the running surfaces, in particular the curved and straight sections, the contact point or the contact line can thus vary from cage bridge to cage bridge.

In another aspect of the disclosure, each of the plurality of cage segments includes a first circumferential ring segment and a second circumferential ring segment and the front cage bridge and the rear cage bridge connect the first circumferential ring segment to the second circumferential ring segment. In addition, the center plane intersects the first circumferential ring segment and the second circumferential ring segment. The axis of rotation may also lie in the center plane.

Another aspect of the disclosure includes a rolling-element bearing cage comprising a plurality of cage segments. At least one of the plurality of cage segment includes a first circumferential ring segment having a central opening and a second circumferential ring segment in the central opening of the first circumferential ring segment. A plurality of bridges connect the first circumferential ring segment to the second circumferential ring segment, which plurality of bridges includes a first bridge, a second bridge and a third bridge. The first and second bridges define a first pocket configured to receive a first rolling element, and the second and third bridges define a second pocket configured to receive a second rolling element. The first bridge defines a front running surface for the first rolling element in the first pocket, and the second bridge defines a rear running surface for the first rolling element in the first pocket and also defines a front running surface for the second rolling element in the second pocket. The third bridge defines a rear running surface for the second rolling element in the second pocket. The first circumferential ring segment includes a first circumferential midpoint between the first bridge and the second bridge, and the second circumferential ring segment includes a second circumferential midpoint between the first bridge and the second bridge. The bearing cage is configured to rotate around an axis of rotation passing through the center of the bearing cage, and an imaginary center plane includes the axis of rotation and the first circumferential midpoint and the second circumferential midpoint. An imaginary extension of the front running surface for the first rolling element in the first pocket makes a first angle with the imaginary center plane and an imaginary extension of the rear running surface for the first rolling element in the first pocket makes a second angle with the imaginary center plane. Also, an absolute value of the first angle is different than an absolute angle of the second angle.

Due to the disclosed asymmetric design of the contact surfaces, larger rolling elements can be used without having to account for the danger of a high impact impulse; however the load capacity of the rolling-element bearing is thereby increased. Furthermore, larger clearances between the cage segments and larger load-free zones can be taken into account.

A smoother running of the rolling-element bearing and lower vibrations in operation result.

BRIEF DESCRIPTION OF THE DRAWINGS

Exemplary embodiments of the disclosure are depicted in the drawings.

DETAILED DESCRIPTION

Figure 1:
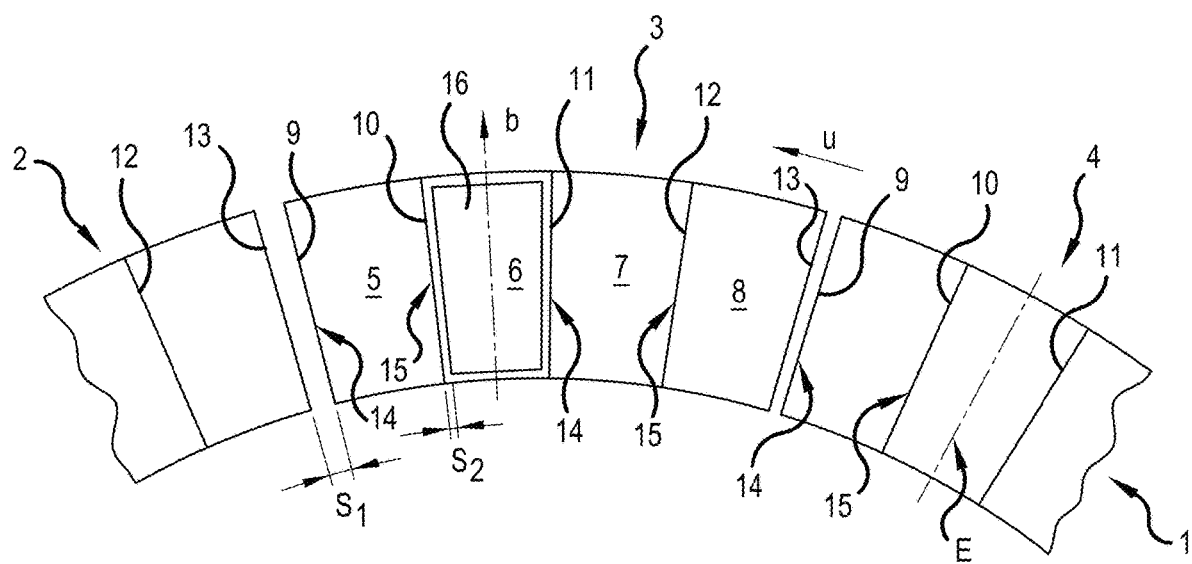
FIG. 1 is a plan view schematically showing one complete cage segment and parts of two additional cages segments on either side thereof viewed in a direction parallel to an axis of rotation.

FIG. 1 shows part of a segmented rolling-element bearing cage 1. Three cage segments 2, 3, 4, one following the other in circumferential direction U, are depicted (only the central cage segment 3 is fully visible). The axis of rotation of the rolling-element bearing cage or of the rolling-element bearing is indicated by a.

In the exemplary embodiment each cage segment 2, 3, 4 has four receiving pockets 5, 6, 7, and 8, each for a single rolling element 16; one of the rollers 16 is schematically shown in a receiving pocket of the cage segment 3. The rolling elements 16, which may be cylindrical or tapered rollers, each rotate around an axis of rotation b.

Each receiving pocket 5, 6, 7, 8 is delineated in the circumferential direction U by a pair of cage bridges. Five cage bridges 9, 10, 11, 12, 13 are illustrated. The rolling element 16 has a known clearance $s_2$ in its circumferential direction U in its receiving pocket.

In addition, there is a clearance $s_1$ between the individual cage segments 2, 3, 4 that is required for functional and manufacturing reasons. Unfortunately, clearance $s_1$ allows for the above-described impacts to occur.

Each receiving pocket 5, 6, 7, 8 is thus delineated by a pair of the respective cage bridges 9, 10, 11, 12, 13. Furthermore, each cage bridge has first and second running surfaces 14 and 15 which may be contacted by the rolling elements 16.

Assuming counterclockwise movement, the cage segment 4 will push against the cage segment 3, and after moving by an amount equal to the clearance $s_1$, the cage segment 3 will impact against the cage segment 2.

Beneficially, according to the preferred embodiments, at least one, but preferably all of the receiving pockets 5, 6, 7, 8 of a cage segment are asymmetric with respect to a center plane E that divides each of the receiving pockets 5, 6, 7, 8. Stated differently, extensions of the running surfaces 14 and 15 of one or more of the receiving pockets 5, 6, 7, 8 do not intersect at the axis of rotation of the bearing cage and/or of the roller bearing. Stated yet differently, "asymmetrically" means that the running surfaces of a given pocket make different angles with the center plane that divides each of the pockets. A relevant center plane is a plane that divides the receiving pockets and passes through the axis of rotation of the bearing cage.

Figure 2:
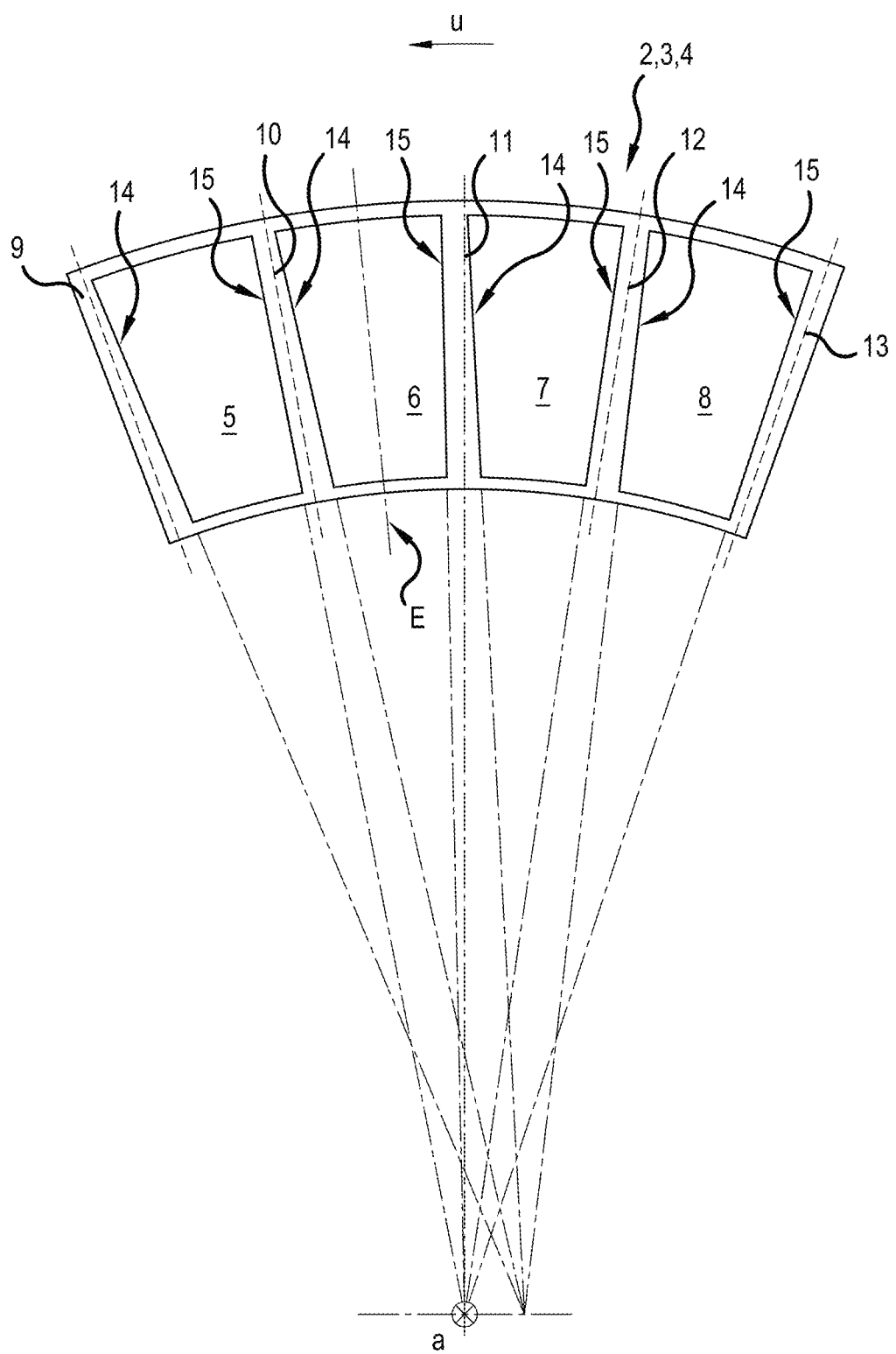
FIG. 2 is a plan view of one of the cage segments of FIG. 1, showing the configuration of the cage bridges in more detail.

This is illustrated in more detail in FIG. 2. It is assumed here (as also in the other figures) that the cage segments depicted move counterclockwise. The running surfaces 15 lying rearward with respect to the direction of movement are configured in a conventional manner, and extensions of each of these running surfaces 15 extend through the axis of rotation a. However, extensions of the running surfaces 14 lying forward in the direction of movement do not extend through the axis of rotation a. Incidentally different directions can be provided here for all running surfaces 14 of the cage segment, that is, extensions of all running surfaces 14 may not intersect at the same point. Expressed differently, each of the running surfaces 14 of a cage segment may make a different angle relative to the radial direction. Advantageously, this provides different running conditions for all rolling elements in their receiving pockets, and this reduces the risk that all rolling elements will impact against an upstream cage bridge simultaneously.

Figure 3:
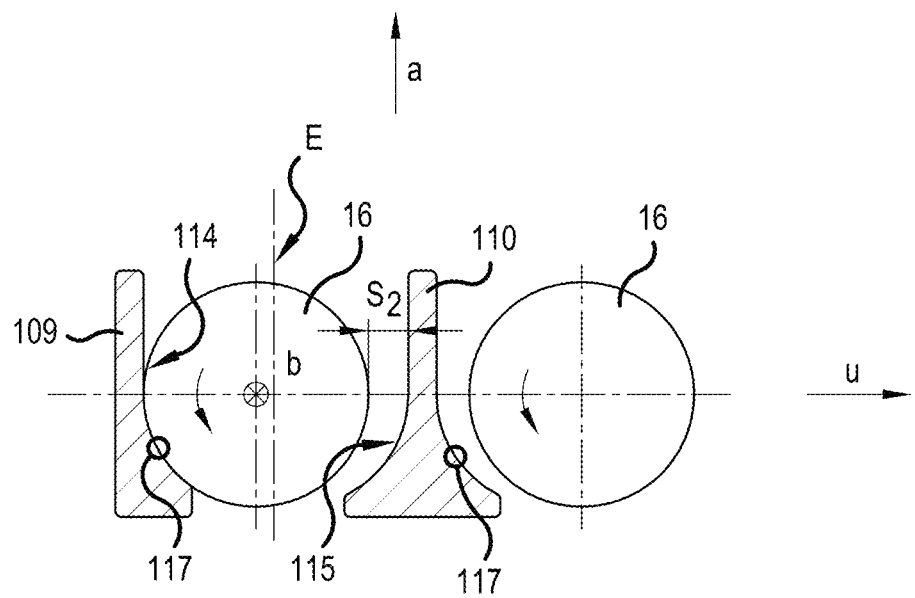
FIG. 3 is a sectional view of two rolling elements in a conventional bearing cage taken transverse to the rolling axis of one of the rolling elements.

In FIG. 3 shows part of a conventional cage bridge in section, specifically two cage pockets and two bridge segments 109 and 110, each of which includes first and second running surfaces 114, 115. It will be appreciated from this figure that the pockets are symmetric with respect to a center plane E and that extensions of the running surfaces 114, 115 of a given cage segment intersect at the axis of rotation a. Accordingly the rolling elements 16 here are shown in receiving pockets. It should be noted that the contact lines 117, that is, the lines at which the rolling elements 16 contact one of the cage bridges, are all located on the same diameter.

Figure 4:
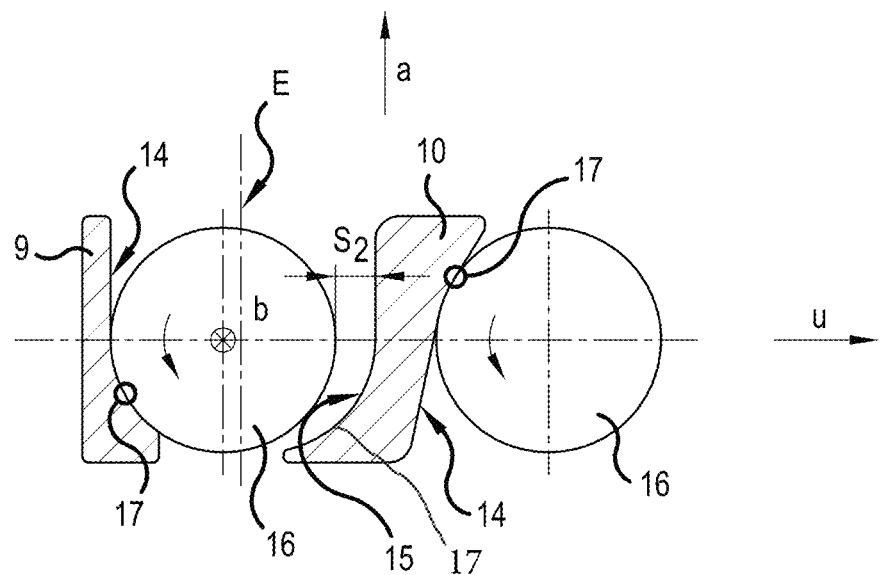
FIG. 4 is a sectional view of two rolling elements in a bearing cage according to an embodiment of the present disclosure taken transverse to the rolling axis of one of the rolling elements.

FIG. 4 illustrates an embodiment of the present disclosure. Because of the asymmetric pocket configuration described above, the running surfaces 14 and 15 do not intersect at the axis of rotation of the bearing cage and consequently, the contact lines 17 at which each rolling element 16 contacts an adjacent cage bridge lie at different diameters. Accordingly different running behaviors of the rolling elements 16 on the cage bridges result depending on whether the cage segment that is frontward (on the left in FIG. 4) or the cage segment that is rearward (on the right in FIG. 4) with respect to the direction of movement is contacted by the rolling element. Moreover, because of the different locations of these contact lines, it is less likely that all four rolling elements retained by a given cage bridge segment will impact against a cage bridge at exactly the same time, and this reduces the likely impact forces that will be experienced by the cage bridges that make up a cage.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing cages.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Rolling-element bearing cage
2 Cage segment
3 Cage segment
4 Cage segment
5 Receiving pocket
6 Receiving pocket
7 Receiving pocket
8 Receiving pocket
9 Cage bridge
10 Cage bridge
11 Cage bridge
12 Cage bridge
13 Cage bridge
14 Running surface
15 Running surface
16 Rolling element
17 Contact point/contact line
109 Cage bridge
110 Cage bridge
114 Running surface
115 Running surface
117 Contact point/contact line
U Circumferential direction
E Center plane
a Axis of rotation of the rolling-element bearing cage
b Axis of the roller-shaped rolling elements
$s_1$ Clearance between the cage segments $s_2$ Clearance of the rolling element in the receiving pocket

What is claimed is:

1. A rolling-element bearing cage comprising a plurality of cage segments,
   each cage segment including at least two adjacent receiving pockets, and
   each receiving pocket being delimited by a front cage bridge having a front running surface for contacting a rolling element and a rear cage bridge having a rear running surface for contacting the rolling element,
   wherein the front running surface and the rear running surface of at least one of the at least two adjacent receiving pockets are asymmetric relative to a center plane that divides the at least one of the at least two adjacent receiving pockets, and
   wherein each of the plurality of cage segments includes a first circumferential ring segment and a second circumferential ring segment radially inside the first circumferential ring segment.

2. The rolling-element bearing cage according to claim 1, wherein the axis of rotation of the bearing ring lies in the center plane.

3. The rolling-element bearing cage according to claim 1, wherein each receiving pocket is configured to receive a tapered rolling element.

4. The rolling-element bearing cage according to claim 1, wherein the front cage bridge and the rear cage bridge connect the first circumferential ring segment to the second circumferential ring segment, and wherein the center plane intersects the first circumferential ring segment and the second circumferential ring segment.

5. The rolling-element bearing cage according to claim 4, wherein the front running surface and the rear running surface of each of the at least two adjacent receiving pockets are asymmetric with respect to the center plane.

6. The rolling-element bearing cage according to claim 5, wherein the at least two adjacent receiving pockets comprise three, four, or five adjacent receiving pockets.

7. The rolling-element bearing cage according to claim 4, wherein an imaginary radially inward extension of each of the front running surfaces does not extend through an axis of rotation of the rolling-element bearing cage.

8. The rolling-element bearing cage according to claim 7, wherein an imaginary radially inward extension of each of the rear running surfaces extends through the axis of rotation of the rolling-element bearing cage.

9. The rolling-element bearing cage according to claim 4, wherein the front running surfaces are configured such that rolling elements in each of the receiving pockets contact the front running surfaces along a front contact line, and the wherein the rear running surfaces are configured such that the rolling elements contact the rear running surfaces along a rear contact line and wherein the front contact line, viewed from the axis of rotation of the rolling-element bearing cage, falls at a different height than the rear contact line.

10. The rolling-element bearing cage according to claim 4, wherein the at least two adjacent receiving pockets are configured for receiving tapered rollers.

11. The rolling-element bearing cage according to claim 4, wherein the bearing cage segments are comprised of plastic.

12. The rolling-element bearing cage according to claim 4, wherein at least two of the plurality of cage segments are separated by a circumferential gap.

13. The rolling-element bearing cage according to claim 4, wherein the plurality of cage segments are not connected to one another.

14. The rolling-element bearing cage according to claim 4, wherein the front running surface forms a first angle with the center plane and the rear running surface forms a second angle with the center plane different than the first angle.

15. The rolling-element bearing cage according to claim 4, wherein the at least two adjacent receiving pockets comprise a first receiving pocket and a second receiving pocket and wherein the front running surface of the first pocket and the front running surface of the second pocket are configured such that a first rolling element in the first pocket contacts the front running surface of the first pocket along a first front contact line and a second rolling element in the second pocket contacts the front surface of the second pocket along a second contact line and wherein the first contact line is radially offset from the second contact line.

16. The rolling-element bearing cage according to claim 15, wherein a length of a radially outer side of the first pocket is different than a length of a radially inner side of the first pocket.

17. A rolling-element bearing cage comprising a plurality of cage segments, at least one of the plurality of cage segment including:
   a first circumferential ring segment having a central opening;
   a second circumferential ring segment in the central opening of the first circumferential ring segment;
   a plurality of bridges connecting the first circumferential ring segment to the second circumferential ring segment, the plurality of bridges including a first bridge, a second bridge and a third bridge, the first and second bridges defining a first pocket configured to receive a first rolling element and the second and third bridges defining a second pocket configured to receive a second rolling element, the first bridge defining a front running surface for the first rolling element in the first pocket, the second bridge defining a rear running surface for the first rolling element in the first pocket and defining a front running surface for the second rolling element in the second pocket and the third bridge defining a rear running surface for the second rolling element in the second pocket,
   wherein the first circumferential ring segment includes a first circumferential midpoint between the first bridge and the second bridge and the second circumferential ring segment includes a second circumferential midpoint between the first bridge and the second bridge,
   wherein the bearing cage is configured to rotate around an axis of rotation passing through the center of the bearing cage,
   wherein an imaginary center plane includes the axis of rotation and the first circumferential midpoint and the second circumferential midpoint,
   wherein an imaginary extension of the front running surface for the first rolling element in the first pocket makes a first angle with the imaginary center plane and an imaginary extension of the rear running surface for the first rolling element in the first pocket makes a second angle with the imaginary center plane and wherein an absolute value of the first angle is different than an absolute angle of the second angle.

18. The rolling-element bearing cage segment according to claim 17, wherein front running surface for the first rolling element in the first pocket and the front running surface for the second rolling element in the second pocket are configured such that the first rolling element in the first pocket contacts the front running surface for the first rolling element in the first pocket along a first front contact line and a second rolling element in the second pocket contacts the front running surface for the second rolling element in the second pocket along a second contact line and wherein the first contact line is radially offset from the second contact line.

19. The rolling-element bearing cage according to claim 17, wherein a portion of the first circumferential ring segment connecting the first bridge and the second bridge has a first length and wherein a portion of the second circumferential ring segment connecting the first bridge and the second bridge has a second length different than the first length.

20. A rolling-element bearing cage comprising a plurality of cage segments, at least one of the plurality of cage segment including:
a first circumferential ring segment having a central opening;
a second circumferential ring segment in the central opening of the first circumferential ring segment;
a plurality of bridges connecting the first circumferential ring segment to the second circumferential ring segment, the plurality of bridges including a first bridge, a second bridge and a third bridge, the first and second bridges defining a first pocket configured to receive a first rolling element and the second and third bridges defining a second pocket configured to receive a second rolling element, the first bridge defining a front running surface for the first rolling element in the first pocket, the second bridge defining a rear running surface for the first rolling element in the first pocket and defining a front running surface for the second rolling element in the second pocket and the third bridge defining a rear running surface for the second rolling element in the second pocket,
wherein the first circumferential ring segment includes a first circumferential midpoint between the first bridge and the second bridge and the second circumferential ring segment includes a second circumferential midpoint between the first bridge and the second bridge,
wherein the bearing cage is configured to rotate around an axis of rotation passing through the center of the bearing cage,
wherein an imaginary center plane includes the axis of rotation and the first circumferential midpoint and the second circumferential midpoint,
wherein an imaginary extension of the front running surface for the first rolling element in the first pocket makes a first angle with the imaginary center plane and an imaginary extension of the rear running surface for the first rolling element in the first pocket makes a second angle with the imaginary center plane and wherein an absolute value of the first angle is different than an absolute angle of the second angle, and
wherein the imaginary extension of the rear running surface for the first rolling element in the first pocket intersects the axis of rotation.

* * * * *